(12) United States Patent
Xiang et al.

(10) Patent No.: US 9,759,376 B2
(45) Date of Patent: Sep. 12, 2017

(54) FLAT PANEL TV BRACKET

(71) Applicant: LOCTEK VISUAL TECHNOLOGY CORP., Ningbo, Zhejiang (CN)

(72) Inventors: Lehong Xiang, Ningbo (CN); Tao Lin, Ningbo (CN)

(73) Assignee: LOCTEK VISUAL TECHNOLOGY CORP., Ningbo (CN)

( * ) Notice: Subject to any disclaimer, the term of this patent is extended or adjusted under 35 U.S.C. 154(b) by 0 days.

(21) Appl. No.: 15/116,595

(22) PCT Filed: Jan. 28, 2015

(86) PCT No.: PCT/CN2015/071742
§ 371 (c)(1),
(2) Date: Aug. 4, 2016

(87) PCT Pub. No.: WO2015/161696
PCT Pub. Date: Oct. 29, 2015

(65) Prior Publication Data
US 2016/0348834 A1 Dec. 1, 2016

(30) Foreign Application Priority Data
Apr. 22, 2014 (CN) .......................... 2014 1 0162790

(51) Int. Cl.
A47B 96/06 (2006.01)
F16M 13/02 (2006.01)
F16M 11/12 (2006.01)

(52) U.S. Cl.
CPC .......... *F16M 13/022* (2013.01); *F16M 11/12* (2013.01); *F16M 2200/04* (2013.01)

(58) Field of Classification Search
USPC ..................................... 248/205.1
See application file for complete search history.

(56) References Cited

U.S. PATENT DOCUMENTS

| 6,905,101 | B1 * | 6/2005 | Dittmer | F16M 11/10 248/125.7 |
| 7,028,961 | B1 * | 4/2006 | Dittmer | F16M 11/04 248/278.1 |

(Continued)

FOREIGN PATENT DOCUMENTS

| CN | 201354922 | 12/2009 |
| CN | 201661832 | 12/2010 |

(Continued)

OTHER PUBLICATIONS

International search report dated Apr. 3, 2015 from corresponding No. PCT/CN2015/071742.

*Primary Examiner* — Monica Millner
(74) *Attorney, Agent, or Firm* — Hauptman Ham, LLP

(57) ABSTRACT

A flat panel TV bracket includes a bracket body and a display hanging plate assembly. The bracket body includes a wall mounting plate, a first rocker arm and a second rocker arm. The display hanging plate assembly includes a hanging plate and a connector. The connector rotatably includes a support plate and a rotating plate. The support plate pivotally connects with a connecting block. The rotating plate fixedly connects with the hanging plate, the lower end of the rotating plate pivotally connects with the lower end of the support plate, and the upper end of the rotating plate slidably connects with the upper end of the support plate. The second rocker arm includes a rotating block; upper and lower arms; and upper and lower arm housings; and an air spring. The air spring rotatably connects with the lower arm on the rotating block and pivotally connects with the connecting block.

6 Claims, 4 Drawing Sheets

(56) References Cited

U.S. PATENT DOCUMENTS

| | | | | |
|---|---|---|---|---|
| 7,338,022 B2* | 3/2008 | Hung | ............... | F16M 11/041 |
| | | | | 248/278.1 |
| 7,380,760 B2* | 6/2008 | Dittmer | ............... | F16M 11/041 |
| | | | | 248/278.1 |
| 7,694,927 B2* | 4/2010 | Chuang | ............... | F16M 11/041 |
| | | | | 248/276.1 |
| 7,866,621 B1* | 1/2011 | Walters | ............... | F16M 11/08 |
| | | | | 248/421 |
| 8,366,060 B2* | 2/2013 | Hung | ............... | F16M 11/041 |
| | | | | 248/124.1 |
| 8,561,955 B2* | 10/2013 | Stemple | ............... | F16M 11/04 |
| | | | | 248/276.1 |
| 2004/0027541 A1 | 2/2004 | Angerpointner et al. | | |
| 2005/0205734 A1* | 9/2005 | Wang | ............... | F16M 11/2064 |
| | | | | 248/276.1 |
| 2008/0029661 A1* | 2/2008 | Chen | ............... | F16M 11/105 |
| | | | | 248/176.1 |
| 2010/0327129 A1* | 12/2010 | Chen | ............... | F16M 11/14 |
| | | | | 248/121 |
| 2012/0006767 A1* | 1/2012 | Bennett | ............... | A47B 81/00 |
| | | | | 211/26 |
| 2013/0314890 A1* | 11/2013 | Smith | ............... | F16M 11/10 |
| | | | | 361/825 |

FOREIGN PATENT DOCUMENTS

| | | |
|---|---|---|
| CN | 102242858 | 11/2011 |
| CN | 202074209 | 12/2011 |
| CN | 103939713 | 7/2014 |
| CN | 203948892 | 11/2014 |

* cited by examiner

FLAT PANEL TV BRACKET

RELATED APPLICATIONS

The present application is a National Phase of International Application Number PCT/CN2015/071742, filed Jan. 28, 2015, and claims the priority of China Application No. 201410162790.3, filed Apr. 22, 2014, which are incorporated herein by reference in their entireties.

TECHNICAL FIELD

The present invention relates to a flat panel TV bracket.

BACKGROUND ART

Television is one of commonly used electric appliances in people's daily life. Along with the rapid development of our national economy, remarkable rise in people's living standards, and the rapid development of TV technology, television is developing to a large screen, ultra-thin profile and diversified. Meanwhile, TV brackets are developing continuously and are applied more widely. At present, flat panel TV brackets are available in both leftward/rightward adjustment and upward/downward adjustment, for example, an all-directional free-arm display bracket disclosed on the website of State Intellectual Property Office, and the technical solution disclosed includes: a base, a display hanging plate assembly, a butterfly-shaped screw rod, a first rocker arm and a second rocker arm, one end of the first rocker arm rotatably connects with a rotating shaft on the base, the other end of the first rocker arm rotatably connects with one end of the second rocker arm, the other end of the second rocker arm connects with a connecting block, and the connecting block rotatably connects with the display hanging plate assembly. The display hanging plate assembly comprises a hanging plate and a connector, one end of the connector pivotally connects with a connecting block, and the other end of the connector rotatably connects with the hanging plate. In the bracket in order to prevent the display on the hanging plate from inclining downwards with the hanging plate by its own weight, two torsion springs are generally mounted on pins of the hanging plate to increase the resistance to downward rotation of the hanging plate. However, in the case of adjusting the angle of downward rotation of the hanging plate, people need to overcome the elastic force of the torsion springs, and the larger the angle of downward rotation, the larger the force required. As a result, the adjusting of the angle of the hanging plate is labor-consuming and is inconvenient to operate, and the control of the rotation of the hanging plate is not flexible. Also, in the prior art, an opening is formed at the bottom of a cable clip on a rocker arm of a flat panel TV bracket, a cable is packed into the cavity of the cable clip through the opening, so that the cable is likely to fall out of the cable clip from the opening at the bottom of the cable clip, affecting normal use of the flat panel TV bracket.

SUMMARY OF THE INVENTION

The technical solution to be solved in the present invention is to overcome the above defects in the prior art and provide a flat panel TV bracket for realizing a labor-saving operation and a flexible adjustment during upward/downward adjusting a hanging plate.

The technical solution of the present invention is to provide a flat panel TV bracket that has the following structure: which comprises: a bracket body and a display hanging plate assembly, the bracket body comprises a wall mounting plate connecting with a wall surface, a first rocker arm and a second rocker arm, one end of the first rocker arm rotatably connects with the wall mounting plate, the other end of the first rocker arm rotatably connects with the second rocker arm, and the other end of the second rocker arm rotatably connects with a connecting block; the display hanging plate assembly comprises a hanging plate and a connector, the connector rotatably connects with the connecting block, and the connector comprises a support plate and a rotating plate, the support plate pivotally connects with the connecting block via a pin, the rotating plate fixedly connects with the hanging plate, the lower end of the rotating plate pivotally connects with the lower end of the support plate, and the upper end of the rotating plate connects with the upper end of the support plate in a sliding manner; an air spring is disposed inside the second rocker arm, one end of the air spring pivotally connects with one end of the second rocker arm, and the other end of the air spring pivotally connects with the connecting block.

The second rocker arm comprises a rotating block, an upper arm, a lower arm, an upper arm housing and a lower arm housing, the rotating block rotatably connects with the first rocker arm, one end of the upper arm pivotally connects with the rotating block and the other end of which pivotally connects with the connecting block; one end of the lower arm pivotally connects with the rotating block, the other end of which pivotally connects with the connecting block, one end of the air spring rotatably connects with a hinge pin of the lower arm on the rotating block, and the other end of the air spring pivotally connects with the connecting block. The upper arm housing fixedly connects with the upper arm, and the lower arm housing fixedly connects with the lower arm.

With the above structure, compared with the prior art, the flat panel TV bracket of the present invention has the following advantages: the flat panel TV bracket comprises a wall mounting plate, a first rocker arm, a second rocker arm and a display hanging plate assembly, one end of the first rocker arm rotatably connects with the wall mounting plate, the other end of the first rocker arm rotatably connects with the second rocker arm, and the other end of the second rocker arm rotatably connects with a connecting block; the display hanging plate assembly comprises a hanging plate and a connector, the connector comprises a support plate and a rotating plate, the rotating plate pivotally connects with the connecting block via a pin, the lower end of the rotating plate pivotally connects with the lower end of the support plate, and the upper end of the rotating plate connects with the upper end of the support plate in a sliding manner. As the rotating plate can rotate along the pin at the lower end thereof, and the upper end of the rotating plate slides along the upper end of the support plate, all that is needed for adjusting the pitching angle of a flat panel TV on the hanging plate is to drive the hanging plate to rotate upwards or downwards. Therefore, for upward/downward adjusting of the hanging plate, the operation is labor-saving and the adjustment is flexible.

The upper arm and the lower arm and the rotating block and the connecting block form a four-bar linkage mechanism, to realize upward/downward angle adjustment of the second rocker arm, and during upward/downward adjustment of the second rocker arm, the air spring in the second rocker arm plays a supporting and limiting effect, so that during upward/downward angle adjustment of the second rocker arm, the adjustment accuracy and stability are improved, the flat panel TV on the hanging plate remains vertical to the bottom plane all the time, and the regulation of integral display bracket is relatively flexible.

Preferably, that the upper end of the rotating plate connects with the upper end of the support plate in a sliding manner refers to that two horizontally and symmetrically disposed long arc-shaped holes are provided on the upper end of the rotating plate, two convex positioning columns are provided on both side walls of the upper end of the support plate, a spacing between the two positioning columns fits within the two long arc-shaped holes on the upper end of the rotating plate, and adjustment nuts are provided on protruding ends of the two positioning columns. The long arc-shaped holes on the upper end of the rotating plate slide along the two convex positioning columns, and adjustment nuts are provided on protruding ends of the two positioning columns, the adjustment nuts can adjust the friction force between the rotating plate and the support plate, thereby making the rotation of the rotating plate smooth and steady, and thus realizing a labor-saving operation and a flexible adjustment during the upward/downward adjustment of the hanging plate of the flat panel TV bracket.

Preferably, the long arc-shaped holes are holes with lower ends and higher mid-sections. A configuration of the long arc-shaped holes allows for more convenient and accurate positioning of the rotating plate when the rotating plate rotates upward or downward.

As an improvement, a longitudinal opening is provided on the bottom of the lower arm housing, for allowing a cable to be placed into the interior of the lower arm housing, and a limiting snap removably connects to both side walls of the longitudinal opening. The cable connecting the flat panel TV on the hanging plate can be placed into the interior cavity of the lower arm housing via the longitudinal opening on the bottom of the lower arm housing, then the longitudinal opening is enveloped by using the limiting snap, so that when the bracket body rotates for adjustment, the cable will not be exposed from the longitudinal opening of the lower arm housing, thereby improving the security while not affecting the use of the flat panel TV.

Preferably, the limiting snap is a limiting snap with a "⊥"-shaped cross-section, and the limiting snap is plugged with both side walls of the longitudinal opening. In other words, two sockets are provided on both side walls of the longitudinal snap, along which the sockets extend longitudinally and extend through the two ends, and the two sockets are plugged with both side walls of the longitudinal opening; the limiting snap with this shape can be directly plugged onto both side walls of the longitudinal opening, thus it is convenient for both mounting and removing.

As shown in the figures:
1. wall mounting plate; 2. first rocker arm; 3. second rocker arm; 4. connecting block; 5. connector; 6. hanging plate; 7. support plate; 8. rotating plate; 9. arc-shaped sliding chute; 10. positioning column; 11. adjustment nut; 12. rotating block; 13. upper arm; 14. lower arm; 15. upper arm housing; 16. lower arm housing; 17. air spring; 18 limiting snap; 19. longitudinal opening.

DETAILED DESCRIPTION OF THE INVENTION

The present invention will be further described in detail with reference to the accompanying drawings and detailed description.

Figure 1:
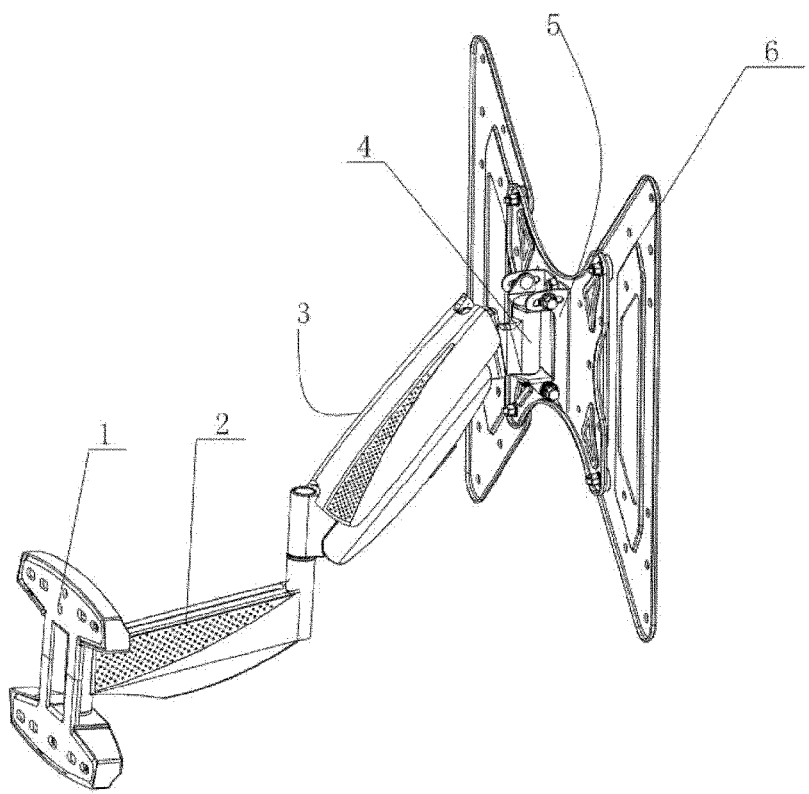
FIG. 1 is a structural schematic diagram of a flat panel TV bracket according to the present invention.
Figure 2:
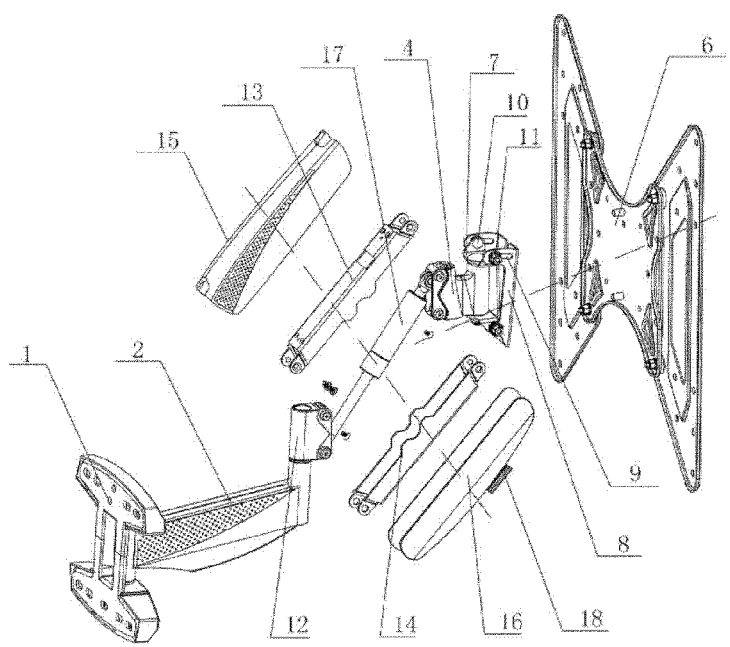
FIG. 2 is a structural schematic diagram of assembly of a flat panel TV bracket according to the present invention.
Figure 3:
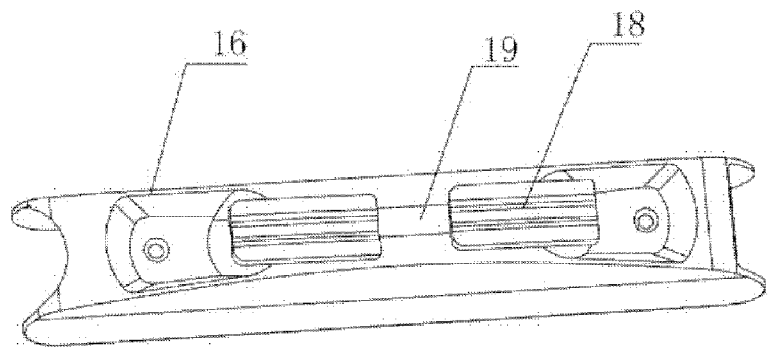
FIG. 3 is a structural schematic diagram of a lower arm housing of a flat panel TV bracket according to the present invention.
Figure 4:
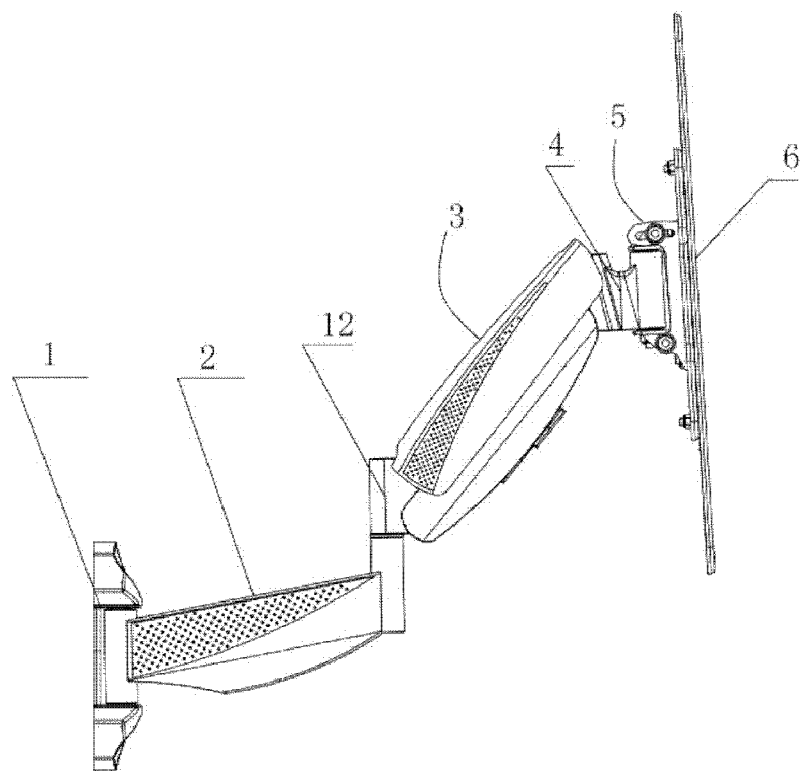
FIG. 4 is a structural schematic diagram of rotation of a rotating plate of a flat panel TV bracket to the intermediate position according to the present invention.
Figure 5:
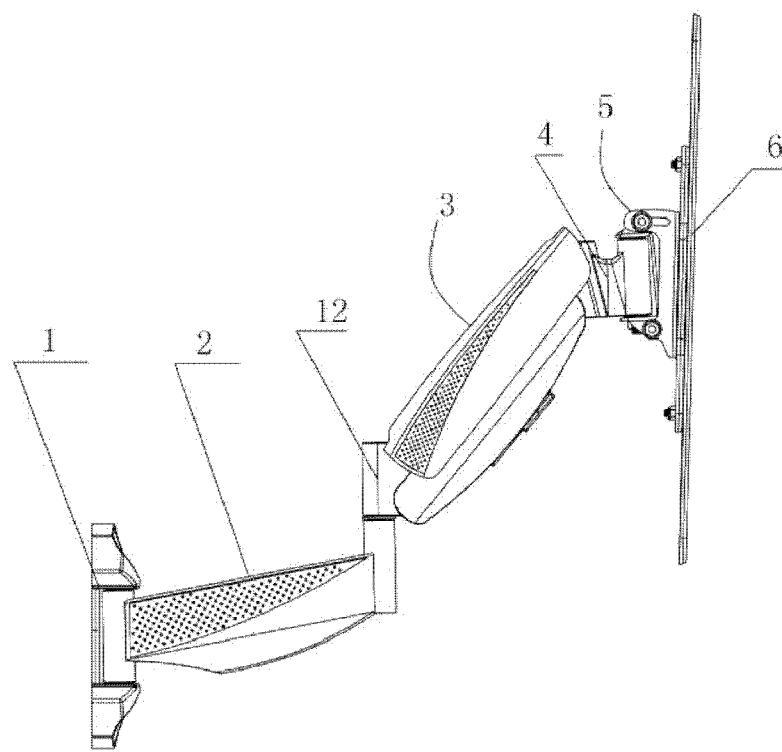
FIG. 5 is a structural schematic diagram of downward adjustment of a rotating plate of a flat panel TV bracket according to the present invention.
Figure 6:
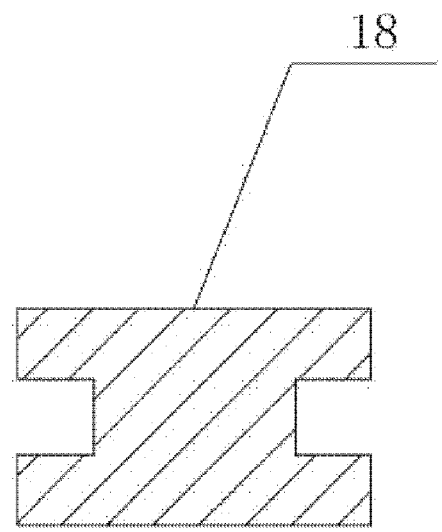
FIG. 6 is a structural schematic diagram of a cross section of a lower arm housing of a flat panel TV bracket according to the present invention.

As shown in FIGS. 1, 2, 3, 4, 5 and 6;

The present invention relates to a flat panel TV bracket, the flat panel TV bracket comprises a bracket body and a display hanging plate assembly. The bracket body comprises a wall mounting plate 1 connecting with a wall surface, a first rocker arm 2 and a second rocker arm 3. One end of the first rocker arm 2 rotatably connects with the wall mounting plate 1, the other end of the first rocker arm 2 rotatably connects with the second rocker arm 3, and the other end of the second rocker arm 3 rotatably connects with a connecting block 4. The display hanging plate assembly comprises a hanging plate 6 and a connector 5, the connector 5 rotatably connects with the connecting block 4, and the connector 5 comprises a support plate 7 and a rotating plate 8. The support plate 7 pivotally connects with the connecting block 4 via a pin, and the rotating plate 8 fixedly connects with the hanging plate 6. The lower end of the rotating plate 8 pivotally connects with the lower end of the support plate 7, and the upper end of the rotating plate 8 connects with the upper end of the support plate 7 in a sliding manner. An air spring 17 is provided inside the second rocker arm 3, one end of the air spring 17 pivotally connects with one end of the second rocker arm 3, and the other end of the air spring 17 pivotally connects with the connecting block 4.

The second rocker arm 3 comprises a rotating block 12, an upper arm 13, a lower arm 14, an upper arm housing 15 and a lower arm housing 16, the rotating block 12 rotatably connects with the first rocker arm 2, one end of the upper arm 13 pivotally connects with the rotating block 12, and the other end thereof pivotally connects with the connecting block 4; One end of the lower arm 14 pivotally connects with the rotating block 12 and the other end thereof pivotally connects with the connecting block 4, one end of the air spring 17 rotatably connects with a hinge pin of the lower arm 14 on the rotating block 12, and the other end of the air spring 17 pivotally connects with the connecting block 4. The upper arm housing 15 fixedly connects with the upper arm 13, and the lower arm housing 16 fixedly connects with the lower arm 14.

That the upper end of the rotating plate 8 connects to the upper end of the support plate 7 in a sliding manner refers to that two horizontally and symmetrically disposed long arc-shaped holes 9 are provided on the upper end of the rotating plate 8, two convex positioning columns 10 are provided on both side walls of the upper end of the support plate 7, a spacing between the two positioning columns 10 fits within the two long arc-shaped holes 9 on the upper end of the rotating plate 8, and adjustment nuts 11 are provided on the protruding ends of the two positioning columns 10.

The long arc-shaped holes 9 are arc-shaped holes 9 with lower ends and higher mid-sections. A longitudinal opening 19 is provided on the bottom of the lower arm housing 16, for allowing a cable to be placed into the interior of the lower arm housing, and a limiting snap 18 removably connects to both side walls of the longitudinal opening 19.

The limiting snap 18 is a limiting snap 18 with a "工"-shaped cross-section, and the limiting snap 18 is plugged with both side walls of the longitudinal opening 19.

The invention claimed is:

1. A flat panel TV bracket comprising a bracket body and a display hanging plate assembly, the bracket body comprising a wall mounting plate connecting with a wall surface, a first rocker arm and a second rocker arm; one end of the first rocker arm rotatably connecting with the wall mounting plate, the other end of the first rocker arm rotatably connecting with the second rocker arm, and the other end of the second rocker arm rotatably connecting with a connecting block; and the display hanging plate assembly comprising a hanging plate and a connector, the connector rotatably connecting with the connecting block; wherein, the connector comprises a support plate and a rotating plate, the support plate pivotally connects with the connecting block via a pin, the rotating plate fixedly connects with the hanging plate, the lower end of the rotating plate pivotally connects with the lower end of the support plate, and the upper end of the rotating plate connects with the upper end of the support plate in a sliding manner; an air spring is disposed inside the second rocker arm, one end of the air spring pivotally connects with one end of the second rocker arm, and the other end of the air spring pivotally connects with the connecting block.

2. The flat panel TV bracket according to claim 1, wherein the second rocker arm comprises a rotating block, an upper arm, a lower arm, an upper arm housing and a lower arm housing, the rotating block rotatably connects with the first rocker arm, one end of the upper arm pivotally connects with the rotating block, and the other end of which pivotally connects with the connecting block; one end of the lower arm pivotally connects with the rotating block, the other end of which pivotally connects with the connecting block, one end of the air spring rotatably connects with the hinge pin of the upper arm and the lower are on the rotating block, and the other end of the air spring pivotally connects with the connecting block; the upper arm housing fixedly connects with the upper arm, and the lower arm housing fixedly connects with the lower arm.

3. The flat panel TV bracket according to claim 1, wherein the upper end of the rotating plate connecting with the upper end of the support plate in a sliding manner refers to that two horizontally and symmetrically disposed long arc-shaped holes are provided on the upper end of the rotating plate, two convex positioning columns are provided on both side walls of the upper end of the support plate, a spacing between the two positioning columns fits within the two long arc-shaped holes on the upper end of the rotating plate, and adjustment nuts are provided on protruding ends of the two positioning columns.

4. The flat panel TV bracket according to claim 1, wherein the long arc-shaped holes are arc-shaped holes with lower ends and higher mid-sections.

5. The flat panel TV bracket according to claim 1, wherein a longitudinal opening is provided on the bottom of the lower arm housing, for allowing a cable to be placed into the interior of the lower arm housing, and a limiting snap removably connects to both side walls of the longitudinal opening.

6. The flat panel TV bracket according to claim 5, wherein the limiting snap is a limiting snap with a "工"-shaped cross-section, and the limiting snap is plugged with both side walls of the longitudinal opening.

* * * * *